UNITED STATES PATENT OFFICE.

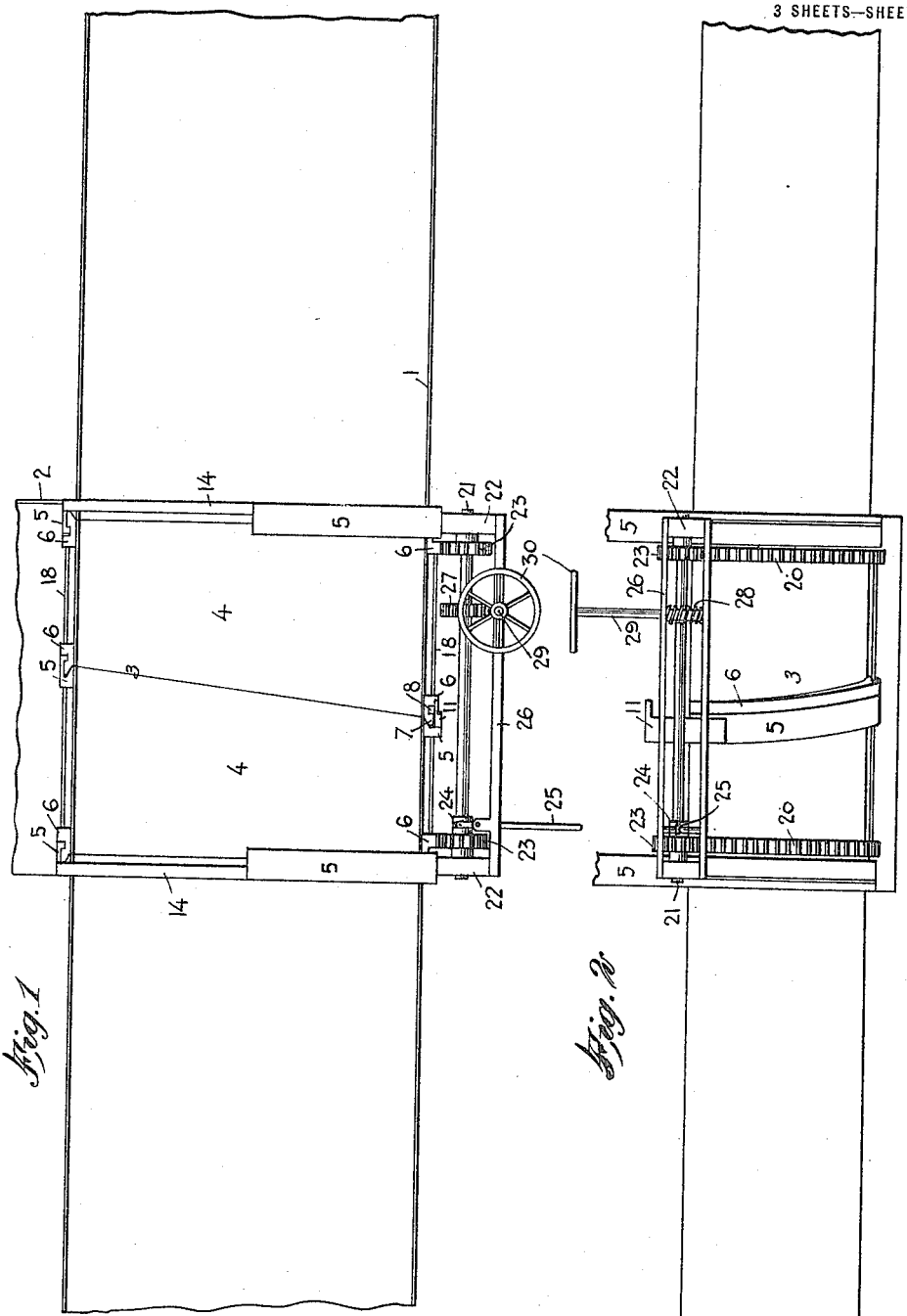

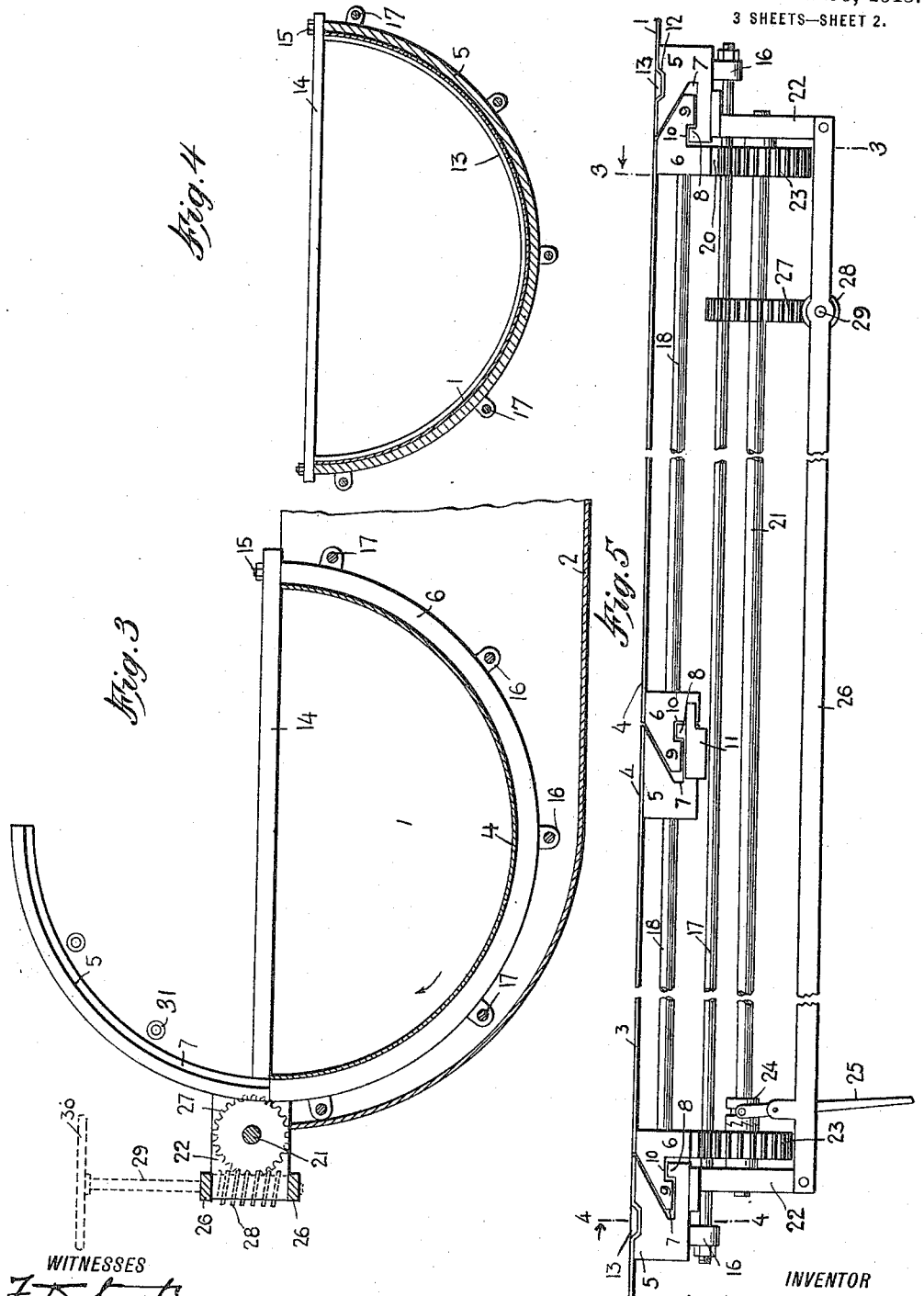
A. J. BLAKELY.
FLUME GATE.
APPLICATION FILED APR. 2, 1913.
1,158,165.
Patented Oct. 26, 1915.
3 SHEETS—SHEET 2.
INVENTOR
Archie J. Blakely
ATTORNEYS

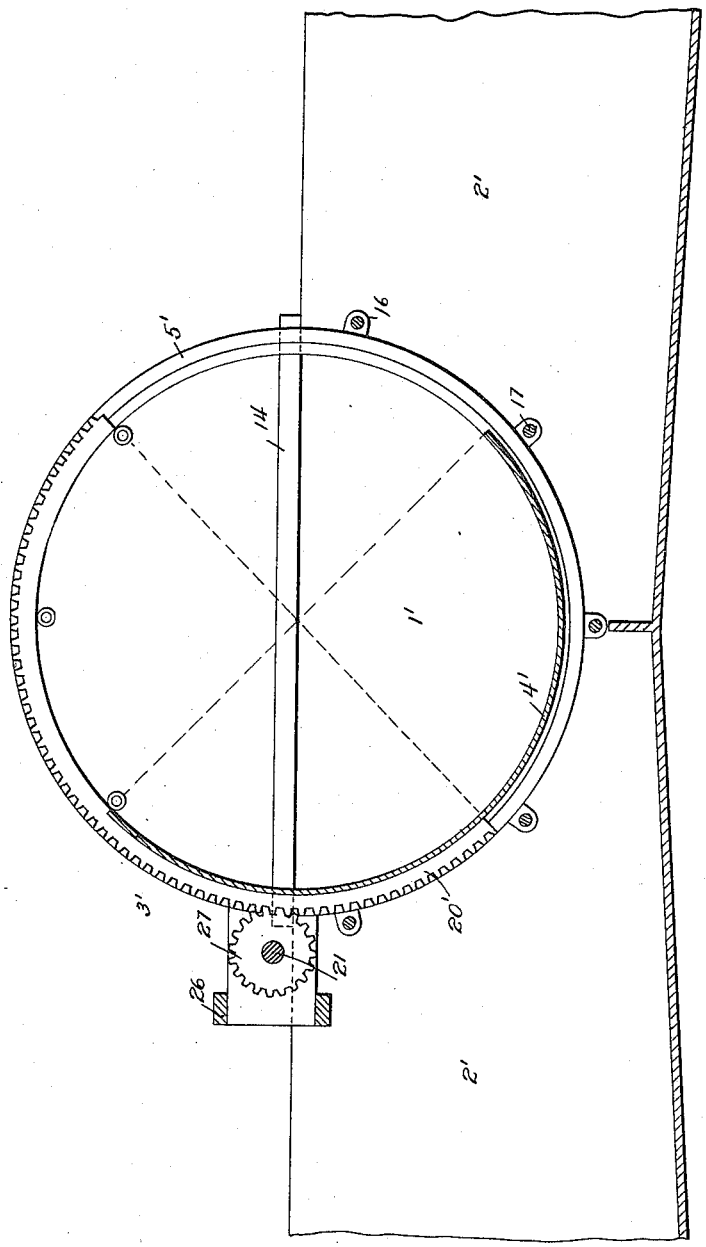

ARCHIBALD J. BLAKELY, OF CHANDLER, ARIZONA.

FLUME-GATE.

1,158,165.  Specification of Letters Patent.  Patented Oct. 26, 1915.

Application filed April 2, 1913. Serial No. 758,321.

*To all whom it may concern:*

Be it known that I, ARCHIBALD J. BLAKELY, a citizen of the United States, and a resident of Chandler, in the county of Maricopa and State of Arizona, have invented a new and Improved Flume-Gate, of which the following is a full, clear, and exact description.

My invention relates to a gate for a flume for water, particularly a flume that is semicircular in cross section; and an object thereof is to produce a gate which can be readily adjusted and which is particularly adapted to control the communication between the main conduit and a branch, or branches, leading therefrom.

A further object of my invention is to produce a gate which will tightly engage the sides of the opening when it is moved to closed position and thus prevent any leakage into a branch, or branches, when the flume is closed, and which, when the time arrives for the operator to open the gate the same will first be loosened so that it can readily be moved to the required extent.

Reference is to be had to the accompanying drawings forming a part of this specification, in which the same characters of reference indicate the same parts in all the views.

Figure 1 is a top plan of my improved gate in position at a point where a branch flume leads from the main flume; Fig. 2 is a side elevation thereof; Fig. 3 is a sectional view on the line 3—3 of Fig. 5; Fig. 4 is a sectional view on the line 4—4 of Fig. 5; Fig. 5 is an enlarged plan view of the operating mechanism for the gate; and Fig. 6 is a section similar to Fig. 3 showing a gate controlling two branches.

My gate is adapted to be used in connection with the main flume 1 wherever the same is joined to a branch flume 2, and the gate, which I may refer to as a whole by the numeral 3, is made in sections 4, each of these sections comprising steel plates bent to correspond with the internal diameter of the flume 1, and having their adjacent edges on a slant, as shown in Fig. 1, for a purpose which will appear later. As shown in Fig. 5, in particular, the plates which form the gate are of the same thickness and bent on the same internal and external diameter as the plates which form the sides of the flume.

The plates 4 are provided along their adjacent slanting edges with a guideway 5 and a guide 6. The guideway 5 is secured to the edge of one plate and the guide 6, which engages the guideway, to the adjacent edge of the other plate. To the straight edge of each of the plates 4 a guide 6 is secured engaging a guideway 5 secured to the adjacent edge of the main flume plate. Each guideway has an annular recess 7 therein and carries along one end of this recess an annular rib 8 which projects toward the plate on which the guideways 5 are carried. Each guide 6 is provided with a projection 9 extending into the recess 7 and having an annular groove 10 which receives the rib 8. These guideways 5 and guides 6 are mounted on the outer or convex sides of the plates. The guideways secured to the flume plates are extending at one end above the main flume, as shown in Fig. 3, and form a complete circle, as shown in Fig. 6. These extensions are to properly direct the gate when the same is moved to open a branch from the main flume. It will now be seen that when the gate sections 4 are in closed position the adjacent beveled slanting edges of the guideway 5 and guide 6 secured to the adjacent edges of the plates 4 will force the guide 6 secured to the straight edge of each of the plates 4 with the beveled sides against both sides of the guideways 5 on the main flume. This will force the gate into tight engagement with the flume on either side of the gate. The engagement of the beveled surfaces of the guides and guideways will prevent leakage from the main flume into the branch. When the gate is to be opened, the right section 4 is moved first, see Fig. 1, this movement taking place in the direction of the arrow shown; and as soon as the end of the middle guide 6 engages the extension 11 secured to the adjacent guideway 5, the other section 4 will be moved with the first section. In this way the sections are first loosened before they are moved to establish connection between the main flume and a branch.

The guideways 5 may be secured to the steel plates forming the flume 1 by being grooved and having the plates pressed into the groove by means of semi-circular ribs 13. These ribs will thus form an annular rib or bead which will enter the groove in the concave face of the guideways 5 and make a tight joint. The semi-circular ribs 13 are curved to the required extent and forced down by means of cross-bars 14 secured by bolts 15 to the opposite ends of the guideways 5. These semi-circular ribs will crowd the metal of the plate into the grooves on the guideways to the required extent.

The guideways 5 secured to the flume have projections 16 which are joined by brace rods 17, and the central guideway 5 and guide 6 on the gate sections are secured to the end guides 6 by means of brace rods 18, thus forming a strong and rigid construction. The guideways 5 may have rollers mounted therein to engage the projections 9 of the ribs 6, so that friction is reduced when the gate is moved.

On the guides 6, at each end of the gate, I form racks 20, these racks being slightly over a quarter of a circle for a flume for one branch, as shown in Figs. 1 and 2; and slightly over half a circle for a flume having two opposite branches, as shown in Fig. 6. The racks are located on the under side of the gate 4 when the same is closed. They are operated by means of a shaft 21 supported in bearings 22, these bearings being secured to the convex faces of the guideways 5 secured to the flume 1 at either end of the gate. The shaft 21 carries operating pinions 23, one of which is fixed on the shaft and the other loose thereon. This loose pinion is shown at the left of Fig. 5 and it is arranged to be connected to the shaft by means of a suitable clutch 24, this clutch being operated by a lever 25 mounted upon cross-bars 26 joining the outer ends of the bearings 22 together. The rod 21 is turned by means of a pinion 27 engaged by means of a worm gear 28. This worm gear is operated by means of a spindle 29 mounted in bearings in the bars 26 and having at its upper end a wheel 30.

The operation of my sluice gate will now be plain. The bottom of the flume 2 will be extended up to the bottom of the bearing members 22, as shown in Fig. 3, and the edges of the bottom 2 where the same is curved up to the bearing members will be connected to the bottom of the flume 1 on both sides of the gate to make a tight joint, the top edges of the main flume and branch flume being on the same level, as will be readily understood. When it is desired to open the gate, the pinion 23 at the left, Figs. 1 and 5, is unclutched and the hand wheel 30 turned. This moves the gate section 4 at the right on Fig. 1 to loosen the sections so as to enable the gate to be moved freely, and as soon as the guide 6 engages the extension 11 it is in position to move the other section with it. The lever 25 is now operated to throw in the clutch 24 and connect the other pinion 23 to the shaft. Further movement then moves both the sections together and opens the gate to the required extent.

The portion of guides 5 lying above the main flume are provided with rollers 31 adapted to engage the concave surface of plates 4, so as to reduce friction in the guideways when the gate is displaced to connect a branch with the main flume.

In Fig. 6 the main flume 1' is shown to branch out into two opposite flumes 2' controlled by a circular gate 3' of the same structure as gate 3, with the exception that the racks 20' are semi-circular and the guideways 5' secured to the convex side near the edge of the plates of the main flume are circular. The gate 3' is operated similarly to the gate 3, with the exception that due to the relation of the rack 20' and the gate 3' the same may be so located as to open the branches one at a time or close them both together. If desired, the ratchet can be made three-fourths of a circle, thus permitting the opening of both branches at the same time. As shown in Fig. 6, the gate 3' establishes communication to the right-hand branch 2' with the main flume 1', the gate being revolved through an angle of 45 degrees. It can be easily seen that by revolving the gate through an angle of 90 degrees, the opening from the main flume to the right branch 2' will be at its maximum. By reversing the motion of the gate, for example, through an angle of 90 degrees from what is shown in Fig. 6, the gate 3' will close the right branch and establish communication of the main flume with the left branch. The gate opening would then be the same as the gate opening as now shown on the right side of Fig. 6.

It will be seen that I have produced a gate which can be closed as tightly as required and which will eliminate all leakage. At the same time, any degree of adjustment can be obtained when the gate is to be opened, and the flow of water through the flume 2 thus accurately regulated. The construction of my invention is simple and very easy to operate.

I wish to have it understood that the above description is illustrative only and that I do not care to be limited to the exact combination of parts shown and described, but reserve for myself the right to make such changes in the shape, size and arrangement of the parts as fairly fall within the scope and spirit of my invention.

Having thus described my invention, I claim as new and desire to secure by Letters Patent:

1. The combination of a main flume, semi-circular in cross-section, branch flumes communicating therewith, a gate comprising a pair of trapezoidal sections of the same curvature as the main flume, guideways secured to the convex side of the main flume on either side of the gate, guides secured to the gate sections on the convex side thereof to engage the guideways, and means for actuating said gate sections to control communication with the branch flumes.

2. The combination of a main flume semi-circular in cross-section, a branch flume communicating therewith, a gate comprising a pair of curved sections located in the main flume adjacent the branch flume, said sections having their adjacent edges slanting with respect to the length of the flume, guideways secured to the main flume on the convex side thereof on either side of the gate, guides secured to the opposite ends of the gate on the convex side thereof to engage said guideways, a guide secured to the convex side of one section along the slanting edge thereof, a guideway secured to the convex side of the other section along the slanting edge thereof, said guideway having an extension to be engaged by the end of the associated guide, means for transmitting motion to the section having the guide, and means for subsequently transmitting motion to both of said sections together, whereby the gate can first be loosened and then opened.

3. The combination of a main flume, a side flume communicating therewith, the main flume being semi-circular in cross-section, a gate comprising a pair of sections inserted into the length of the main flume, the adjacent edges of said sections being slanting with respect to the length of the flume, one of said sections being provided on its convex face with a guide along said slanting edge and the other of said sections being provided on its convex face with a guideway to receive said guide along its adjacent edge, means connected with one of said sections to engage the other section when the same has been moved a short distance to permit the gate to be loosened, guideways secured to the convex side of the main flume on either side of the gate extending above the main flume, guides secured at the ends of the gate on the convex side thereof to engage said guideways on the flume, racks carried by said gate sections, a shaft having a pinion to engage one of said racks, means for operating said shaft, a pinion for engaging the other rack, and a clutch for connecting said shaft to said other pinion to rotate with the shaft, whereby the shaft can be turned to move one of said sections to loosen the gate, and then turned to move both of said sections to open the same.

4. The combination of a main flume semi-circular in cross-section, opposite branch flumes communicating therewith, a gate comprising a pair of curved sections located in the main flume adjacent the branch flumes, said sections having their adjacent edges slanting with respect to the length of the flume, circular guideways secured to the main flume on the convex side thereof on either side of the gate, semi-circular guides secured to the opposite ends of the gate on the convex side thereof engaging the said circular guideways, a semi-circular guide secured to the convex side of one section of the gate along the slanting edge thereof, a semi-circular guideway secured to the convex side of the other section along the slanting edge thereof, said semi-circular guideway having an extension to be engaged by the end of the associated semi-circular guide, means for transmitting motion to the section for the guide, and means for subsequently transmitting motion to both of said sections together, whereby the gate is first loosened and then opened.

5. The combination of a main flume, opposite side flumes communicating therewith, the main flume being semi-circular in cross-section, a gate comprising a pair of sections inserted in the length of the main flume, the adjacent edges of said sections being slanting with respect to the length of the flume, one of said sections being provided on its convex face with a semi-circular guide along said slanting edge and the other of said sections being provided on its convex face with a semi-circular guideway to receive said guide along its adjacent edge, means connected with one of said sections of the gate for engaging the other section when the first-named section has been moved a short distance to permit the gate to be loosened, circular guideways secured to the convex side of the main flume on either side of the gate, the semi-circular guides secured at the ends of the gate on the convex side thereof engaging said guideways on the flume, racks carried on said gate sections, a shaft having a pinion engaging one of said racks, means for operating said shaft, a pinion engaging the other rack, and a clutch for connecting said shaft to said other pinion to rotate with the shaft, whereby the shaft can be turned to move one of said sections to loosen the gate, and then turned to move both of said sections to open the same.

6. The combination of a main flume, a branch flume communicating therewith, a gate for controlling said communication, said gate comprising a pair of sections arranged side by side and having oblique adjacent sides, means interlocking said slanting sides, means for moving said sections, and means whereby one of said sections has an initial movement before the other section is moved.

7. The combination of a main flume and a branch flume communicating therewith, a gate for controlling said communication, said gate comprising a pair of trapezoidal sections the oblique sides of which sections are adapted to form a joint, means interlocking said sections at the joint, means for moving said sections, and means whereby one of said sections has an initial movement before the other section is moved.

8. The combination of a main flume and a branch flume communicating therewith, a gate comprising a pair of trapezoidal sections for controlling said communication, guideways secured to the sides of the main flume on either side of the gate, guides secured to the gate section engaging the guideway, means at the slanting sides of the trapezoidal sections interlocking the same, means for actuating said gate sections, and means whereby one of the sections has an initial movement before the other section is actuated.

9. The combination of a main flume, a branch flume communicating therewith, a gate for controlling said communication, said gate comprising a pair of quadrilateral sections, each having oblique sides which are adapted to form a locking joint, and gate operating means adapted to move said sections at the joint when the gate is opened or closed.

10. The combination of a main flume, a branch flume communicating therewith, a gate for controlling said communication, said gate comprising a pair of trapezoidal sections, the oblique sides of which sections are adapted to form a locking joint, and gate operating means including means for bringing said sections together or apart at the joint when the gate is opened or closed.

11. The combination of a main flume, a branch flume communicating therewith, a gate controlling said communication, said gate comprising a pair of rectangular trapezoidal sections, the oblique sides of which sections are adapted to form a joint, and gate operating means including means for moving said sections together or apart at the joint when the gate is opened or closed.

12. The combination of a main flume, a branch flume communicating therewith, a gate for controlling said communication, said gate comprising a pair of sections arranged side by side and having oblique adjacent sides, locking means at the oblique sides for preventing the collapse of the gate at the joint formed by the oblique sides of the sections, means for moving said sections simultaneously including means whereby said sections have a relative movement when the gate is opened or closed.

13. The combination of a main flume and a branch flume communicating therewith, said main flume being semi-circular in cross section, a pair of plates forming the sections of the gate for controlling such communication, said plates being curved to correspond with the curvature of the main flume and having oblique adjacent sides, means for moving said sections simultaneously, and means for causing relative movement to said sections when said gate is opened or closed.

In testimony whereof I have signed my name to this specification in the presence of two subscribing witnesses.

ARCHIE J. BLAKELY.

Witnesses:
F. V. N. DANA,
GEORGE HOLLAND BINKLEY.

Copies of this patent may be obtained for five cents each, by addressing the "Commissioner of Patents, Washington, D. C."